L. M. V. H. BARADUC-MULLER.
PROCESS OF TREATING MELTED METALS, ALLOYS, AND STEELS.
APPLICATION FILED AUG. 16, 1911.
1,071,632.
Patented Aug. 26, 1913.
4 SHEETS—SHEET 3.
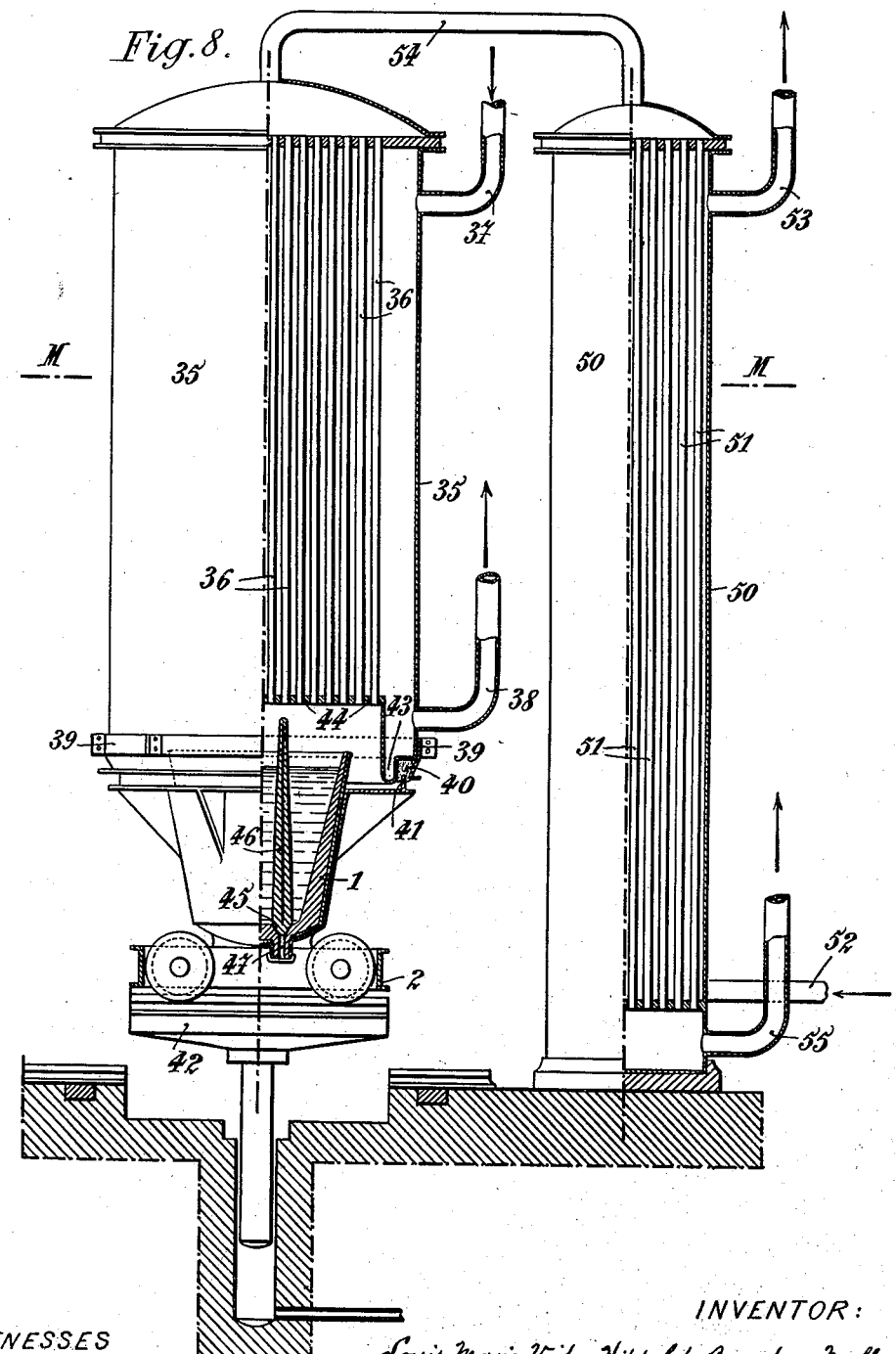

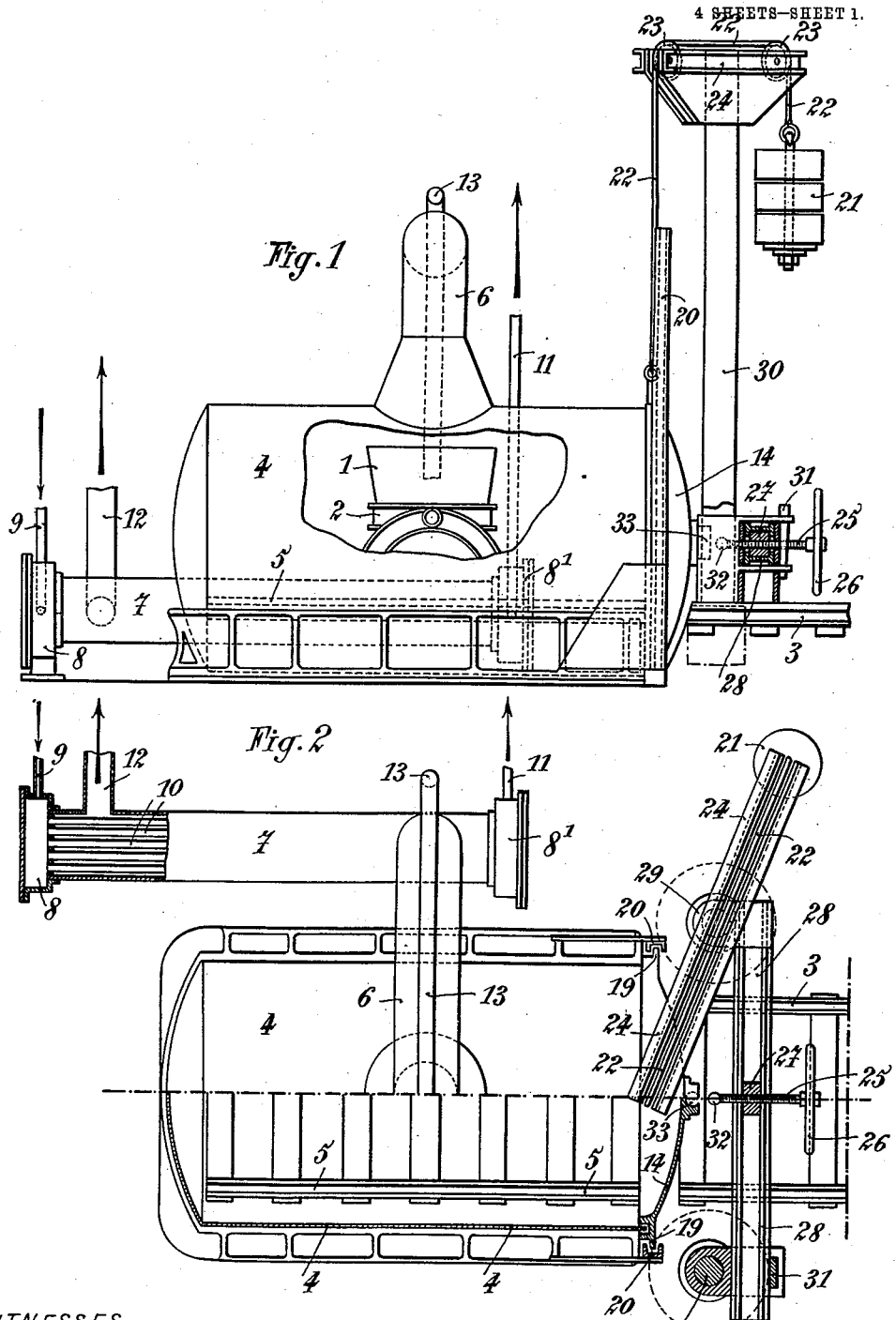

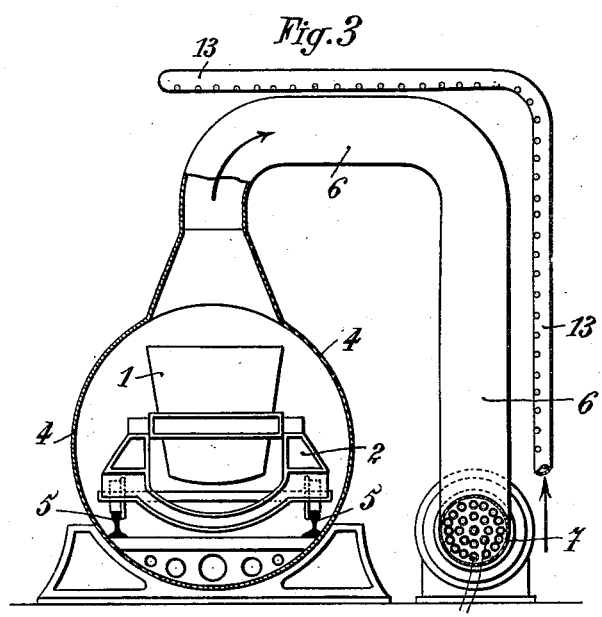
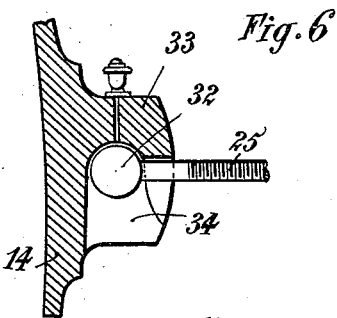
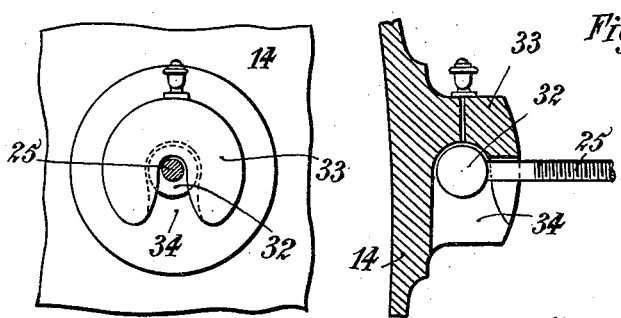
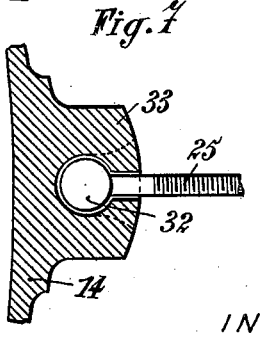
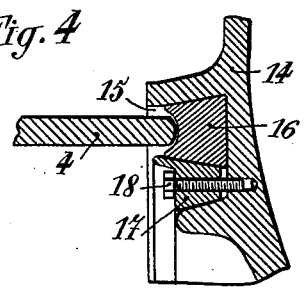

L. M. V. H. BARADUC-MULLER.
PROCESS OF TREATING MELTED METALS, ALLOYS, AND STEELS.
APPLICATION FILED AUG. 16, 1911.
1,071,632.
Patented Aug. 26, 1913.
4 SHEETS—SHEET 4.
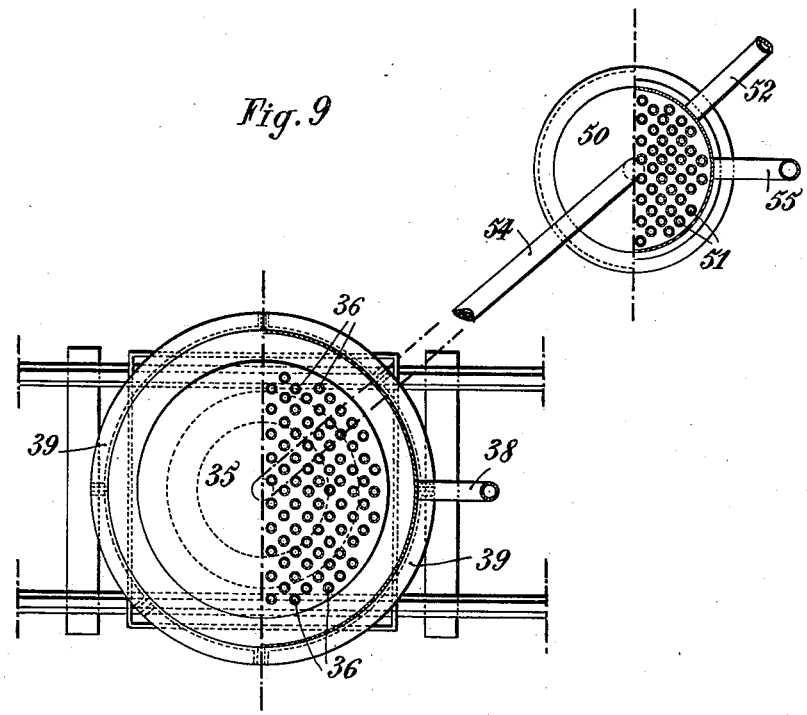
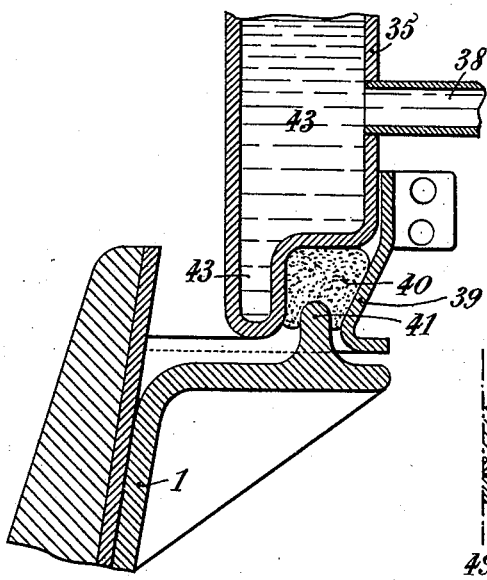
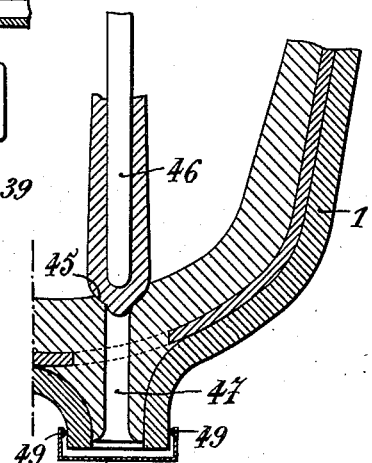
WITNESSES:
Fred White
René Buine
INVENTOR:
Louis Marie Victor Hippolyte Baraduc-Muller,
By Attorneys,
Fraser, Trask & Myers

UNITED STATES PATENT OFFICE.

LOUIS MARIE VICTOR HIPPOLYTE BARADUC-MULLER, OF PARIS, FRANCE.

PROCESS OF TREATING MELTED METALS, ALLOYS, AND STEELS.

1,071,632.   Specification of Letters Patent.   Patented Aug. 26, 1913.

Application filed August 16, 1911. Serial No. 644,384.

*To all whom it may concern:*

Be it known that I, LOUIS MARIE VICTOR HIPPOLYTE BARADUC-MULLER, a citizen of the Republic of France, and residing at Paris, France, have invented certain new and useful Improvements in Processes of Treating Melted Metals, Alloys, and Steels, of which the following is a specification.

There are two sources of the gases which exist in metals and alloys and in particular cast steels. One of these is the conditions under which the melting furnace (crucible furnace, acid or basic Siemens-Martin furnace) is operated, or the conditions under which the refining furnace (Siemens-Martin, acid or basic furnace, acid or basic Bessemer converter) is operated. The other source is the internal chemical reactions which give rise to gases (for example the chemical actions of carbonaceous matter on the oxids fused or dissolved in the liquid metal). It is not possible to distinguish sharply between these sources of gases since they exist concomitantly and vary only in their respective intensities. However this may be, for a given thermal and chemical treatment to which a given metal is subjected at a given temperature in a given melting or refining furnace there is produced an equilibrium between the quantities of gases derived from the first and second sources respectively, an equilibrium which corresponds with the maximum quantity of gas dissolved in the fused metal or alloy and of which an important portion remains in the cold solidified metal.

The gases which are most generally found in cold metals, alloys and steels after they have been subjected to igneous fusion, are hydrogen, nitrogen, carbon-monoxid, and carbon dioxid. It is logical to admit that these same gases existed in solution in the melted metals, alloys and steels and that only the total quantity, and the relation of each to this total, vary, owing to the fact that the gases escape during the cooling. A study of the formation of these gases and an attempt to realize the condition in which they exist in metals generally show that they are simply dissolved and not in the form of stable chemical combinations. In fact the quantity of dissolved gases depends on the nature and the temperature of the fused alloy, on the pressure and on the chemical composition of the external gaseous atmosphere, in such a manner that the quantity may be represented by $$Q = Kf(MTP)$$

in which $K$ is a co-efficient dependent on the nature of the metal, on the composition of the gases and on the surface of the metal in contact therewith, $M$ is the mass of the melted alloy, $T$ the temperature of the metal, $P$ the pressure. The higher the temperature the farther apart are the molecules of the metal owing to dilatation and in consequence the greater is the intermolecular volume available for the gases passing into solution. Moreover, the higher the pressure of the gases in the atmosphere to which the melted metal is exposed the greater the quantity of gases which will dissolve. This explains the fact that metals, alloys and steels melted in a blast crucible furnace contain more gases than the same metal melted in a crucible furnace operated by natural draft and that steel made in an acid or basic converter contains more gas than steel of the same composition prepared in an acid or basic Siemens-Martin furnace. In fact in the Bessemer converter or the Thomas converter the pressure of the blast exceeds that of the atmosphere by about 1.5 kilo, so that there is gaseous supersaturation and super-oxidation. When at the finishing point the oxid produced is reduced by carbon, the gases generated at this moment dissolve in greater part and increase the proportion of gases in solution in the hot metal. When the liquid metals, alloys and steels cool, they contract, and the pressure set up by the diminution of the volume of the metal increases, at each instant of the cooling, the pressure of the dissolved gases, until this pressure becomes sufficiently great to overcome the atmospheric pressure and the internal friction, which oppose the escape of the gases. From this moment the gases escape regularly into the atmosphere until the internal friction, which increases rapidly as solidification proceeds, prevents more and more this escape. Finally the escape of the gases becomes extremely slow or even impossible. Thus the state of equilibrium is attained for ordinary temperature and pressure, and corresponds with a certain proportion of gas occluded in the cold ingot, the quantity being dependent on, among other things, the conditions of cooling.

When a rapid and complete superficial solidification prevents the gases from escaping freely into the atmosphere above the metal there are formed in the subjacent still liquid metal pockets wherein the pressure of the gases may be very much higher than that of the atmosphere even when the ingot is cold. Finally a mechanical agitation, notably a gyratory movement, by creating in a liquid metal a centrifugal force, engenders an accumulation of the metal at the periphery and increases the pressure in the metal. This pressure is transmitted to the dissolved gases and expels them in the form of bubbles which escape principally at the periphery of the moving metal. These phenomena prove the simple dissolution of the gases in the melted metals and the unstable state of equilibrium in which they are until the metal has completely cooled, a state of equilibrium of dissolution which is only attained owing to the influence of atmospheric pressure which opposes all premature disengagement of the gases. It is logical therefore to admit that if one could upset this equilibrium of dissolution by diminishing the external pressure tangentially to the same of the alloy while this is still liquid, it should be possible to extract from the melted alloy all the dissolved gases whatever may be their source. The problem is particularly worthy of being solved in the case of steels produced in acid or basic converters for such steels may contain, even when they are cold 4, 5 or even 10 times their volume of gas according to their chemical composition and the duration of the thermal treatment and the cooling operation to which they are subjected.

The present invention has for its object to remove from metals, alloys and steels not only the gases which may be disengaged by the cooling of the metal but those which remain actually occluded in the cold ingots of metal, alloy or steel which have undergone igneous fusion whatever may be the character of the melting furnace or refining furnace used. For this purpose the gases are extracted from the metal, alloy or steel while they are still liquid, that is to say under the best conditions for facilitating the disengagement of the gases, so that ingots or castings are obtained which are free from dissolved occluded gases and therefore have a very high degree of compactness and homogeneity. In this manner blow holes and pockets which form in the head of the ingot and thus depreciate the value of the head to such an extent that this portion has to be separated, are avoided; a considerably larger yield of the metal, alloy or steel is therefore obtained.

The process constituting the subject matter of this invention consists in removing the gases contained in metals, alloys or steels while they are in a liquid state and after any solid, liquid or gaseous materials designed for refining the metals and giving them a desired composition have been added in the course of the metallurgical treatment. This removal of the gases from the liquid metals is accomplished by producing above the surface of the liquid metal, alloy or steel a vacuum substantially complete for instance the vacuum represented by 1 millimeter mercury or thereabout. Under this high vacuum the gases are extracted from the perfectly liquid metal, alloy or steel at a high temperature.

The essential particular of this process of extracting the gases contained in melted steel or other metal under a high vacuum produced by means of high power reciprocating or rotary pumps, water ejectors, steam or air ejectors or other suitable apparatus of high power, is that the gases withdrawn are energetically chilled as soon as they are extracted from the liquid metal. This energetic chilling of the gases extracted, before they arrive at the extracting apparatus, may be produced in different manners such as by atomizing them with steam or cold water, by circulating them through apparatus analogous to gas washers, or by passing them through bundles of tubes around which cold brine or other liquid or cold air, gases or vapors are circulated. It is essential to insist on the special part which this chilling of the gases issuing from the liquid metals plays, because, owing to this the volume of the gases is very much reduced so that the extracting apparatus can remove per unit time a much more considerable weight of gas owing to the small volume of the gas.

The arrangement of the pumps may be varied according to circumstances. Thus they may be in series or in parallel and combined or not with water pumps or ejectors. A combination which gives very good results comprises the application for the extraction of the gases of pumps, which in the first place lower the pressure to a value corresponding with the maximum useful effect of the pumps and then substituting automatically for these pumps vacuum ejectors operated by water or better by steam or compressed air, and adapted to produce finally a substantially absolute vacuum above the liquid metal, alloy or steel, the pressure being thus reduced to a millimeter of mercury or thereabout. While a vacuum may be produced with aid of certain apparatus in a crucible furnace from which the fuel has been removed and containing the metal from which the gases are to be liberated, it is more difficult to produce a vacuum in an acid or basic Bessemer converter although it is not impossible to do so. On the other hand in a Siemens-Martin furnace it is practically impossible to produce a vacuum. The present invention also comprises devices whereby the gases contained in the metals can be extracted by the aid of a vacuum by placing the crucibles or ladles full of the melted metal, alloy or steel, in a vacuum chamber specially constructed to resist external atmospheric pressure and to maintain the vacuum.

Some suitable apparatus for carrying out the process by removing the gases from metals contained in a ladle or crucible are shown in the accompanying drawings.

Figures 1 to 7 show an apparatus with horizontal vacuum chamber into which is introduced the carriage supporting the casting ladle or ladles or the molds containing the melted metals which are to be freed from occluded gases. Fig. 1 is an elevation of the vacuum chamber, Fig. 2 a sectional plan and Fig. 3 a cross section. Figs. 4 to 7 show detail views. Figs. 8 to 11 show an apparatus arranged so that the vacuum may be made directly above the metal contained in the ladle brought up to the base of the apparatus, the hot gases extracted being energetically chilled before they are drawn off by the vacuum pumps and ejectors of high power. Fig. 8 is an elevation partly sectioned, Fig. 9 is a horizontal section by M M Fig. 8; Figs. 10 and 11 show details.

Referring to Figs. 1 to 7, the ladle or crucible 1 containing the molten metal is brought by a carriage 2 on to a platform 3 leading into the chamber 4 to be evacuated. The latter may consist of sheet iron autogenously soldered. Within it there is a railway 5 along which the carriage carrying the ladle travels. From the upper part of the chamber springs a pipe 6 for the escape of air and hot gases under the suction. This pipe leads to a refrigerator which consists of a cylinder 7 containing a bundle of tubes terminating at each end in a box 8 8¹. Into the box 8 opens a pipe 9 through which cold brine is supplied and cools the pipes 10, while from the box 8¹ springs a pipe 11 serving to conduct away the heated brine. The brine cools the bundle of tubes and therefore the hot gases passing around them. The chilled gases then proceed through a pipe 12 to the exhausting apparatus. Cold water is preferably sprinkled from a perforated pipe 13 on the pipe 6 so as to prevent its alteration and partially cool the hot gases.

At one end the vacuum chamber 4, is closed by a circular door 14 of cast iron or steel having a circumferential groove 15 (Fig. 4) wherein is a washer 16 of elastic material impermeable to gases, such as rubber, which makes a tight joint against the end of the cylindrical chamber 4. For adjusting the washer and facilitating its removal the said groove also contains a metallic ring 17 having a wedge-shaped cross section and adapted to be pushed more or less into the groove by means of screws 18 or the like. The door 14 may be displaced vertically when it is not tightly closed, being guided for this purpose by flanges or ears 19 (Fig. 2) moving in channel iron guides 20. In order that the door may be tightly closed against the chamber when it is in its lowered position, the guides 20 are cut away at the corresponding places to allow the ears 19 to pass. The weight of the door is balanced by a weight 21 attached to the door by a chain 22 and passing over pulleys 23 carried by a beam 24. For closing the door tightly there is provided a screw 25 operated by a wheel 26 and working in a nut 27 held between channel irons 28 which constitute a cross beam adapted to turn on a pivot 29. This beam engages in a support 30 symmetrically arranged in relation to its pivot (Fig. 2), and is held in position by a key 31. When the beam is in proper position (Fig. 2) the closing screw 25 is turned so as to abut against the door and close it tightly.

To facilitate the opening of the chamber, the closing screw is preferably constructed, as shown, drawn to an enlarged scale, in front view in Fig. 5, in vertical section in Fig. 6 and in horizontal section in Fig. 7. The screw terminates in a ball 32 fitting a spherical cavity in a projecting piece 33 on the door; the low portion of this projecting piece has an angular opening 34 so that the door 14 may be raised and lowered without the necessity for displacing the closing screw 25. When the door descends into position for closing, the sides of the angular opening 34 embrace the screw 25, the head of which enters the cavity in the piece 33. The head of the screw is then in position for closing the door. As the head is in engagement with the door it suffices to turn the screw 25 in the direction opposite that for closing the door, to exert a traction on the latter and thus to detach it from the chamber the opening of which is thereby facilitated. It is then only necessary to raise the door by pulling the counter-weight so as to allow of passage of the carriage carrying the ladle.

It will be obvious that the vacuum chamber described is adapted to receive casting molds or ingot molds filled with metal instead of a ladle or crucible. The rails or platform 3 cannot be permanently connected with those in the chamber because of the door 14; a bridge is therefore provided for the gap when the door is raised. Instead of a horizontal vacuum chamber, such as has been described, a vertical chamber may be used in the form of a pit into which the crucible, ladle or mold may be lowered.

The carrying out of the process with this apparatus will be easily understood. A ladle containing for example 15 tons of metal, alloy or steel is introduced into the vacuum chamber, the door of which is then hermetically closed, where upon the pumps are set in action. The exhaustion contributes to maintain a perfect closure of the door against the end of the vacuum chamber. After a few moments the temperature of the air in the vacuum chamber attains a limit beyond which it cannot pass in consequence of the chilling effected by the aforesaid sprinkling of water on pipe 13 and owing to the low thermal conductivity of the gases and rarefied air. A part of the gases contained in the metal, alloy or steel are withdrawn together with the hot air from the chamber. The exhaustion is more rapid the more powerful are the pumps used. The hot gases thus removed from the metal pass through the refrigerator before they enter the pumps, water ejectors or other exhausters. The volume and the cooling capacity of the refrigerator must be adapted to chill the gases energetically. In consequence of this chilling the volume of gases withdrawn diminishes for a given weight in proportion as their temperature is lowered from that which they originally had to that which they attain in the refrigerator. The pumps have to extract for a given weight a volume of gas much smaller than if they were pumping hot gases. The exhaustion is thus made much more rapid. It is of the greatest importance that the chilling of the gases should be as intense as possible not only for the sake of diminishing the volume but also because there is a corresponding reduction of pressure in the vacuum chamber, so that the exhaustion of the gases from the metal, alloy or steel is much facilitated.

It has been pointed out above that the vacuum pumps are first put in action and when the manometer indicates that the vacuum in the chamber approaches the limit which can be attained by the pumps, ejectors are put in action until the suitable vacuum is attained; this should be maintained for several seconds. By this time the metal under treatment will have lost the whole or the greater part of its gases. The rapidity of the operation depends only on the power of the pumps and the speed at which the pumps and ejectors effect the exhaustion. The exhaustion being complete the pumps are stopped and air is allowed to enter gradually into the vacuum chamber until the atmospheric pressure has been restored. The door is then opened and the ladle removed to the casting pits. Casting of the metal thus freed from gases is a tranquil operation unattended by ebullition and the metal cast is free from blow holes. The ingots and castings obtained have a satisfactory head and the whole metal is much more compact and homogeneous and of higher tensile strength than metal which has not been subjected to the process. The invention effects a considerable saving in dead heads since there are no blow holes.

Referring to Figs. 8 to 11, the apparatus consists of a vertical cylinder 35 of sheet steel autogenously soldered, containing a bundle of tubes 36 analogous to that of a tubular boiler. These tubes are surrounded by a cooling fluid which may enter at the top of the cylinder in 37 and leave at the bottom thereof at 38 after having been more or less heated by the bundle of tubes. The lower part of the cylinder 35 is surrounded by a collar or sleeve 39 (see Fig. 10) made in several segments bolted together. This collar or sleeve is constricted to accommodate between itself and the lower part of the cylinder a washer ring of rubber or other suitable material 48, for the purpose of making a tight joint. Against this washer ring may be applied a circular flange 41 of the ladle 1 containing the liquid metal or steel which is to be deprived of gases. In order to hermetically close the joint it suffices to mount the ladle 1 on a suitable press and force the said circular flange 41 against the under surface of the rubber washer; for instance the carriage carrying the casting ladle may be brought on to the platform of a hydraulic press 42 situated below the cylinder 35. As soon as the proper degree of pressure has been applied by the hydraulic presss the vacuum pumps may be put in action. The bottom of the cylinder 35 (see Figs. 8 and 10) is preferably inwardly curved so as to form a sleeve of water 43 in contact with the rubber washer 40, so as to prevent alteration of the joint by heat radiated from the ladle.

The lower tube plate 44 within the cylinder 35 is situated at such a height in the latter that there is left a space between the surface of the melted metal and this plate sufficient to insure that particles of melted metal which may be ejected from the mass by ebullition due to escape of gas shall not strike against the tube plate.

To avoid entrance of air through the seat 45 of the plug 46 which stops the casting hole 47 of the ladle (see Fig. 11), there is first soldered or otherwise fixed at the discharge opening of the casting hole a thin sheet of suitable material 48, such that when afterward the plug is withdrawn the sheet is perforated by the jet of liquid steel and it may be also detached by the fusion of the fixing solder 49. The gases issuing from the liquid metal under action of the vacuum are cooled in the bundle of tubes so that their temperature falls from say 1450°–1500° to 350° 300° C.

For the purpose of more completely cooling the gases there may be combined with the cooler just described a second apparatus comprising a cylinder 50 containing a bundle of tubes 51. Cooling fluid, such as chilled brine, is admitted into the bottom part of this cylinder by 52 and leaves the latter at the upper part at 53. The two cylinders 35 and 50 are connected at the top by a suitable pipe 54 so that the gases which are cooled in the first cylinder descend in the second through the tubes 51 which are chilled by the circulating fluid and issue from this second cylinder at its lower part where the pipe 55 communicates with the vacuum pumps. This second apparatus may lower the temperature of the gases to 15° C. or less. The gases then enter the vacuum pumps and the ejectors.

When the extraction of the gases from the molten metal is finished, which is known by the constancy of the vacuum as indicated by a gage, air is admitted into the cylinder 35 above the casting ladle little by little, either by opening the cylinder directly to the atmosphere or, which is better, connecting it with a second evacuating apparatus mounted in series with the first so that the vacuum in the one cylinder may serve to evacuate partially the other, so as to diminish the work of the vacuum pumps in extracting gas from the second evacuating apparatus. When atmospheric pressure is finally reestablished in the apparatus the hydraulic platform 42 is lowered and the casting ladle 1 which now contains a charge of liquid metal free from gas is conducted to the ingot molds.

The heat imparted to the water in the cooling cylinders 35 and 50 may be used for example for evaporating in the cylinder a certain quantity of water, the steam from which may serve to supply a motor if the evacuating operations are sufficiently frequent. In this manner there may be recovered as mechanical energy a certain quantity of the heat energy previously supplied during the fusion to the gases dissolved in the liquid metal.

If the heat is to be utilized in this manner the rubber washer ring should be separately cooled in order that it may not attain the temperature of water boiling under a pressure between 1 and 15 atmospheres, that is to say between 100° and 200° C.

The apparatus disclosed herein is claimed in my divisional application Serial No. 687,009, filed March 29, 1912.

Claims:

1. A process of removing gases from molten steel and the like, within a vacuum chamber, comprising evacuating the air and gases from said chamber, and subjecting the air and gases evacuated from said chamber to a rapid refrigeration to a degree below 0° C. before reaching the evacuating apparatus, whereby the volume and temperature of the air and gases coming from the vacuum chamber are greatly reduced and a high vacuum produced in the vacuum chamber.

2. A process of removing gases from molten steel and the like, within a vacuum chamber, comprising evacuating the air and gases from said chamber of approximately 1 mm. of mercury, and subjecting the air and gases evacuated from said chamber to a rapid refrigeration to a degree below 0° C. before reaching the evacuating apparatus, whereby the volume and temperature of the air and gases coming from the vacuum chamber are greatly reduced and a high vacuum corresponding to a pressure of approximately 1 mm. of mercury produced in the vacuum chamber.

In witness whereof, I have hereunto signed my name in the presence of two subscribing witnesses.

LOUIS MARIE VICTOR HIP-
    POLYTE BARADUC-MULLER.

Witnesses:
 LOUIS EMILE MULLER,
 CHARLES MARDELET.

---

Copies of this patent may be obtained for five cents each, by addressing the "Commissioner of Patents, Washington, D. C."